United States Patent
Garcia-Barrio

(10) Patent No.: US 9,628,552 B2
(45) Date of Patent: *Apr. 18, 2017

(54) METHOD AND APPARATUS FOR DIGITAL MEDIA CONTROL ROOMS

(71) Applicant: Google Inc., Mountain View, CA (US)

(72) Inventor: Laura Garcia-Barrio, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 14/505,113

(22) Filed: Oct. 2, 2014

(65) Prior Publication Data

US 2015/0172372 A1   Jun. 18, 2015

Related U.S. Application Data

(63) Continuation of application No. 13/422,856, filed on Mar. 16, 2012, now Pat. No. 8,862,764.

(51) Int. Cl.
*G06F 15/16* (2006.01)
*H04L 29/08* (2006.01)
(Continued)

(52) U.S. Cl.
CPC .............. *H04L 67/10* (2013.01); *G06F 1/163* (2013.01); *G06Q 10/101* (2013.01);
(Continued)

(58) Field of Classification Search
CPC ........... H04N 21/4307; H04N 21/4788; H04N 21/242; H04N 21/4622; H04N 21/812;
(Continued)

(56) References Cited

U.S. PATENT DOCUMENTS 3,916,094 A   10/1975   Marrone
4,405,943 A   9/1983    Kanaly
(Continued)

FOREIGN PATENT DOCUMENTS

WO   WO 99/05880   2/1999

OTHER PUBLICATIONS

Nagao, Katashi, et al, "Ubiquitous Talker: Spoken Language Interaction with Real World Objects," Technical Report SCSL-TR-95-003, Sony Computer Science Laboratory Inc., Tokyo, Japan, 1995, 11 pages.

(Continued)

*Primary Examiner* — Zarni Maung
(74) *Attorney, Agent, or Firm* — Fish & Richardson P.C.

(57) ABSTRACT

A method and apparatus for providing digital streaming media data to client devices via a digital media control room is described. The method may include receiving a request at a server computer system from a mobile device to join a digital media control room, where the digital media control room is a virtual location that provides access to digital media data of a real-world event captured by a plurality of different mobile devices. The method may also include locating one or more available media streams associated with the digital media control room that capture the real-world event as the real-world event occurs. The method may also include transmitting data indicative of the one or more available media streams to the mobile device.

15 Claims, 9 Drawing Sheets

(51) Int. Cl.
- *H04L 29/06* (2006.01)
- *G06F 1/16* (2006.01)
- *G06Q 10/10* (2012.01)
- *H04N 21/218* (2011.01)
- *H04N 21/258* (2011.01)
- *H04N 21/4223* (2011.01)
- *H04N 21/4788* (2011.01)
- *H04N 21/61* (2011.01)
- *G06F 12/00* (2006.01)

(52) U.S. Cl.
CPC .... *H04L 29/06027* (2013.01); *H04L 65/4084* (2013.01); *H04L 67/02* (2013.01); *H04N 21/21805* (2013.01); *H04N 21/25841* (2013.01); *H04N 21/4223* (2013.01); *H04N 21/4788* (2013.01); *H04N 21/6125* (2013.01)

(58) Field of Classification Search
CPC ......... H04N 21/23424; H04N 21/6405; H04N 7/17318; H04N 21/4143; H04N 21/4302; H04N 21/4341; H04N 21/44016; H04N 21/6587; H04N 21/8547; H04N 21/41407
USPC .............. 709/203, 223–229, 231, 236, 250
See application file for complete search history.

(56) References Cited

U.S. PATENT DOCUMENTS

| | | |
|---|---|---|
| 4,711,512 A | 12/1987 | Upatnieks |
| 4,852,988 A | 8/1989 | Velez et al. |
| 4,972,504 A | 11/1990 | Daniel et al. |
| 5,076,664 A | 12/1991 | Migozzi |
| 5,315,093 A | 5/1994 | Stewart |
| 5,331,544 A | 7/1994 | Lu et al. |
| 5,802,296 A | 9/1998 | Morse et al. |
| 6,011,578 A | 1/2000 | Shatto et al. |
| 6,307,526 B1 | 10/2001 | Mann |
| 6,377,793 B1 | 4/2002 | Jenkins |
| 6,393,136 B1 | 5/2002 | Amir et al. |
| 6,480,713 B2 | 11/2002 | Jenkins |
| 6,526,156 B1 | 2/2003 | Black et al. |
| 6,539,100 B1 | 3/2003 | Amir et al. |
| 6,577,329 B1 | 6/2003 | Flickner et al. |
| 6,608,615 B1 | 8/2003 | Martins |
| 6,661,907 B2 | 12/2003 | Ho et al. |
| 6,681,107 B2 | 1/2004 | Jenkins et al. |
| 6,690,516 B2 | 2/2004 | Aritake et al. |
| 6,707,933 B1 | 3/2004 | Mariani et al. |
| 6,741,756 B1 | 5/2004 | Toyama et al. |
| 6,763,148 B1 | 7/2004 | Sternberg et al. |
| 6,772,129 B2 | 8/2004 | Alvarez et al. |
| 6,957,393 B2 | 10/2005 | Fano et al. |
| 6,961,755 B2 | 11/2005 | Matsuda |
| 6,973,201 B1 | 12/2005 | Colmenarez et al. |
| 7,035,456 B2 | 4/2006 | Lestideau |
| 7,043,056 B2 | 5/2006 | Edwards et al. |
| 7,046,826 B2 | 5/2006 | Toyama |
| 7,062,797 B2 | 6/2006 | Khulusi |
| 7,092,971 B2 | 8/2006 | Idei et al. |
| 7,120,880 B1 | 10/2006 | Dryer et al. |
| 7,262,573 B2 | 8/2007 | Wana et al. |
| 7,340,214 B1 | 3/2008 | Hambera |
| 7,363,024 B2 | 4/2008 | Jenkins |
| 7,558,922 B2 | 7/2009 | Murase |
| 7,565,139 B2 | 7/2009 | Neven et al. |
| 7,643,658 B2 | 1/2010 | Kilner et al. |
| 7,657,062 B2 | 2/2010 | Pilu |
| 7,736,000 B2 | 6/2010 | Enriquez et al. |
| 7,769,632 B2 | 8/2010 | Giraud et al. |
| 7,885,635 B2 | 2/2011 | Laursen et al. |
| 7,936,484 B2 | 5/2011 | Roncall |
| 8,005,507 B2 | 8/2011 | Celik |
| 8,098,894 B2 | 1/2012 | Soderstrom |
| 8,107,921 B2 | 1/2012 | Fiatal |
| 8,130,242 B2 | 3/2012 | Cohen |
| 8,190,733 B1 | 5/2012 | Hoffman et al. |
| 8,255,092 B2 | 8/2012 | Phillips et al. |
| 8,332,424 B2 | 12/2012 | Flynn et al. |
| 8,428,618 B2 | 4/2013 | Fano et al. |
| 2002/0010623 A1 | 1/2002 | McCollom et al. |
| 2002/0102024 A1 | 8/2002 | Jones et al. |
| 2002/0116265 A1 | 8/2002 | Hernandez |
| 2002/0159627 A1 | 10/2002 | Schneiderman et al. |
| 2003/0098954 A1 | 5/2003 | Amir et al. |
| 2003/0107649 A1 | 6/2003 | Flickner et al. |
| 2003/0161500 A1 | 8/2003 | Blake et al. |
| 2004/0100567 A1 | 5/2004 | Miller et al. |
| 2004/0240708 A1 | 12/2004 | Hu et al. |
| 2005/0027794 A1 | 2/2005 | Decker |
| 2005/0125150 A1 | 6/2005 | Wang et al. |
| 2005/0180626 A1 | 8/2005 | Moon et al. |
| 2005/0200476 A1 | 9/2005 | Forr et al. |
| 2005/0203798 A1 | 9/2005 | Jensen et al. |
| 2005/0265581 A1 | 12/2005 | Porter et al. |
| 2005/0267826 A1 | 12/2005 | Levy et al. |
| 2006/0041480 A1 | 2/2006 | Briaas |
| 2006/0212658 A1 | 9/2006 | Hrle et al. |
| 2006/0253491 A1 | 11/2006 | Gokturk et al. |
| 2007/0047816 A1 | 3/2007 | Graham et al. |
| 2007/0096909 A1 | 5/2007 | Lally |
| 2007/0149286 A1 | 6/2007 | Bemmel |
| 2007/0150450 A1 | 6/2007 | Murase |
| 2007/0250901 A1 | 10/2007 | McIntire et al. |
| 2008/0027591 A1 | 1/2008 | Lenser et al. |
| 2008/0063389 A1 | 3/2008 | Fana et al. |
| 2008/0085769 A1* | 4/2008 | Lutnick ................... G07F 17/32 463/41 |
| 2008/0147488 A1 | 6/2008 | Tunick et al. |
| 2008/0167004 A1 | 7/2008 | Jenkins |
| 2008/0254881 A1* | 10/2008 | Lutnick ................... G07F 17/32 463/31 |
| 2008/0285940 A1 | 11/2008 | Kulas |
| 2009/0003662 A1 | 1/2009 | Joseph et al. |
| 2009/0006937 A1 | 1/2009 | Knapp et al. |
| 2009/0093300 A1* | 4/2009 | Lutnick ................... G07F 17/32 463/26 |
| 2009/0094520 A1 | 4/2009 | Kulas |
| 2009/0102859 A1 | 4/2009 | Athsani et al. |
| 2009/0143913 A1 | 6/2009 | Kim et al. |
| 2009/0165140 A1 | 6/2009 | Robinson et al. |
| 2009/0182644 A1 | 7/2009 | Panaqopulos et al. |
| 2009/0189974 A1 | 7/2009 | Deering |
| 2009/0248223 A1 | 10/2009 | Ecton et al. |
| 2009/0287990 A1 | 11/2009 | Lynton et al. |
| 2010/0066587 A1 | 3/2010 | Yamauchi et al. |
| 2010/0103075 A1 | 4/2010 | Kalaboukis et al. |
| 2010/0278439 A1 | 11/2010 | Lennington et al. |
| 2010/0287175 A1 | 11/2010 | Beaudreau et al. |
| 2010/0318507 A1 | 12/2010 | Grant et al. |
| 2010/0318538 A1 | 12/2010 | Wyman et al. |
| 2011/0032324 A1 | 2/2011 | George et al. |
| 2011/0034176 A1 | 2/2011 | Lord et al. |
| 2011/0054717 A1 | 3/2011 | Yamauchi et al. |
| 2011/0085041 A1 | 4/2011 | Kildevaeld |
| 2011/0161423 A1* | 6/2011 | Pratt ...................... G06Q 10/06 709/205 |
| 2011/0184556 A1 | 7/2011 | Seth et al. |
| 2011/0208593 A1 | 8/2011 | Nishida et al. |
| 2011/0213664 A1 | 9/2011 | Osterhout et al. |
| 2011/0246246 A1 | 10/2011 | Johnson |
| 2011/0275432 A1* | 11/2011 | Lutnick ............... G07F 17/3232 463/25 |
| 2012/0094763 A1* | 4/2012 | Khan ...................... H04L 67/38 463/42 |
| 2012/0106857 A1 | 5/2012 | Schneiderman |
| 2012/0173020 A1 | 7/2012 | Seth et al. |
| 2012/0239196 A1 | 9/2012 | Olivier et al. |
| 2012/0308209 A1* | 12/2012 | Zaletel ................. G11B 27/034 386/278 |
| 2012/0323685 A1 | 12/2012 | Ullah |
| 2013/0009994 A1 | 1/2013 | Hill |
| 2013/0036134 A1 | 2/2013 | Neven et al. |

(56) References Cited

U.S. PATENT DOCUMENTS

OTHER PUBLICATIONS

Rekimoto, Jun, "Augmented Interaction: The World Through the Computer," <http://ftp.csl.sony.co.jp/person/rekimoto/navi.html>, 1995, 2 pages.

Rekimoto, Jun, "Augmented Interaction: Toward a New Human-Computer Interaction Style Based on Situation Awareness," Interactive Systems and Software II (WISS'94 Proceedings), 1994 (in Japanese), 10 pages.

Rekimoto, Jun, "The Magnifying Glass Approach to Augmented Reality Systems," International Conference on Artificial Reality and Tele-Existence 1995 I Conference on Virtual Reality Software and Technology (ICAT/VRST 1995), 10 pages.

Rekimoto, Jun, et al, "The World Through the Computer: Computer Augmented Interaction with Real World Environments," User Interface Software and Technology (UIST 1995), 8 pages.

Sung, Dan, "Augmented reality in action—social networking," <http://m.pocketlint.com/news/news.phtml/38918>, Mar. 4, 2011, 7 pages.

Screen Capture of a YouTube Video, "N'importe Comment—The Toxic Avenger Feat Orelsan," <http://www.youtube.com/watch?v=XAOwo6uuhok>, accessed May 10, 2011, 1 page.

Wikipedia, "Lifelog," <http://en.wikipedia.org/wiki/lifelog>, Last Modified Apr. 3, 2011, 3 pages.

Applied Science Laboratories, "H6HS Head Mounted Eye Tracking System," Innovations in Eye Tracking, 2009, 2 pages.

Babcock, J.S., et al, "Building a Lightweight Eyetracking Headgear," Proc of the 2004 Symposium on Eye Tracking Research & Applications, 2004, pp. 109-113.

Herrick, Dan R, "Google This! Using Google Apps for Collaboration and Productivity," ACM SIGUCCS;09, Oct. 11-14, 2009, pp. 55-63.

Li, D, et al, "OpenEyes: A Low-Cost Head-Mounted Eye-Tracking Solution," Proc of the 2004 Symposium on Eye Tracking Research & Applications, 2006, 7 pages.

Machlis, Matthew Alan, "Investigation of Visual Interface Issues in Teleoperation Using a Virtual Teleoperator," S.B. Aeronautics and Astronautics, Massachusetts Institute of Technology, 1989, 169 pages.

Namboodiri, Vinod, "Towards Sustainability in Portable Computing through Cloud Computing and Cognitive Radios," IEEE 2010, 201 O 39th International Conference on Parallel Processing Workshops, pp. 468-475.

PCT/US2012/035275, International Search Report and Written Opinion, Mailed Aug. 13, 2012, 15 pages.

PCT/US2012/35284, International Search Report and Written Opinion, Mailed Jul. 24, 2010, 9 pages.

U.S. Appl. No. 13/107,295, Notice of Allowance, Mailed Aug. 16, 2012, 34 pages.

U.S. Appl. No. 13/344,299, filed Jan. 5, 2012, Anguelov et al.

* cited by examiner

METHOD AND APPARATUS FOR DIGITAL MEDIA CONTROL ROOMS

CROSS-REFERENCE TO RELATED APPLICATIONS

This application is a continuation application of, and claims priority to, U.S. patent application Ser. No. 13/422,856, now U.S. Pat. No. 8,862,764, titled "Method and Apparatus for Digital Media Control Rooms," filed on Mar. 16, 2012. The disclosure of the foregoing application is incorporated herein by reference in its entirety for all purposes.

TECHNICAL FIELD

Embodiments of the invention relate to the field of providing digital media data, and more particularly, to providing digital streaming media data to client devices via a digital media control room.

BACKGROUND

When someone watches an event or visits a particular place, that person is constrained to their view of the event from their present location. At the same time, there may be others experiencing that same event by viewing the event from different locations. The others, however, are also constrained to their single view of the event. Although a broader understanding of the event or place could be gained from the different visual perspectives of the event, a person can only be in one place at one time, and therefore cannot share in a collective view of the event.

SUMMARY

A method and apparatus for providing digital streaming media data to client devices via a digital media control room is described. According to an exemplary method, a request to join a digital media control room is received, where the digital media control room is a virtual location that provides access to digital media data of a real-world event captured by a plurality of different mobile devices. In one embodiment, one or more available media streams associated with the digital media control room that capture the real-world event as the real-world event occurs are located. In one embodiment, data indicative of the one or more available media streams is transmitted to the mobile device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
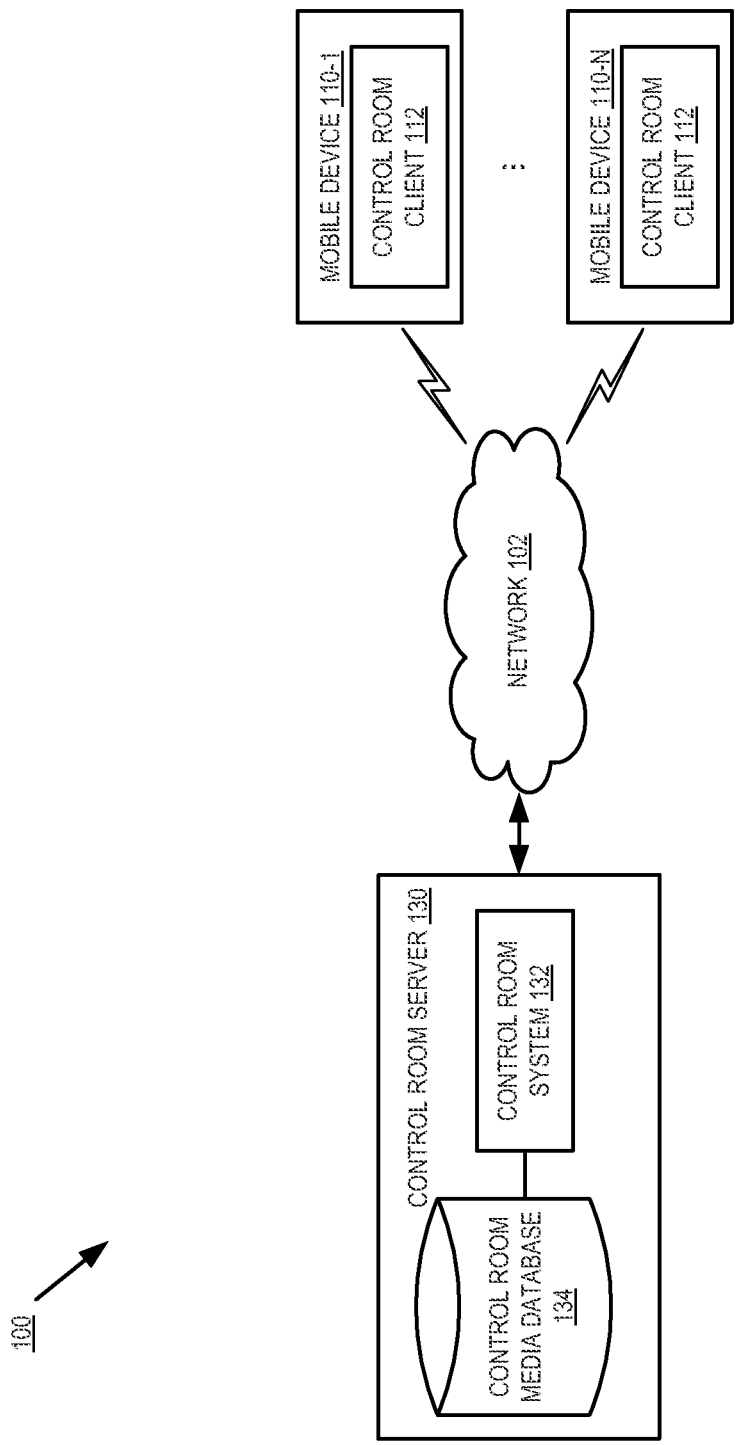
FIG. 1 is a block diagram of exemplary system architecture for enabling digital media control rooms.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "locating", "transmitting", "streaming", "synchronizing", "storing", "providing", "searching", "creating", "associating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 8:
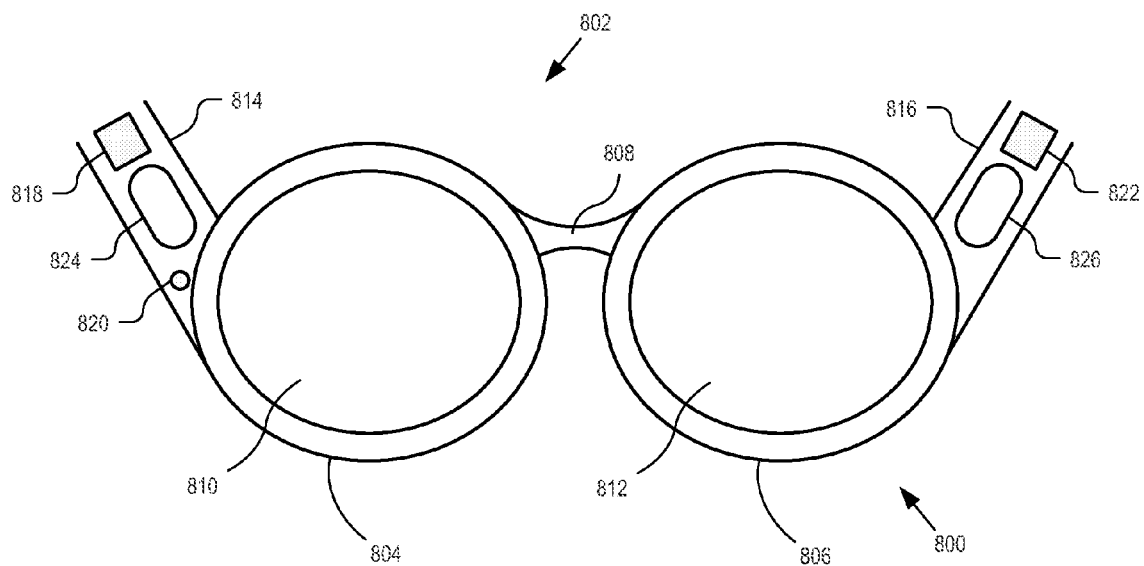
FIG. 8 illustrates an example system for receiving, transmitting, and displaying digital media data for digital media control rooms.
Figure 9:
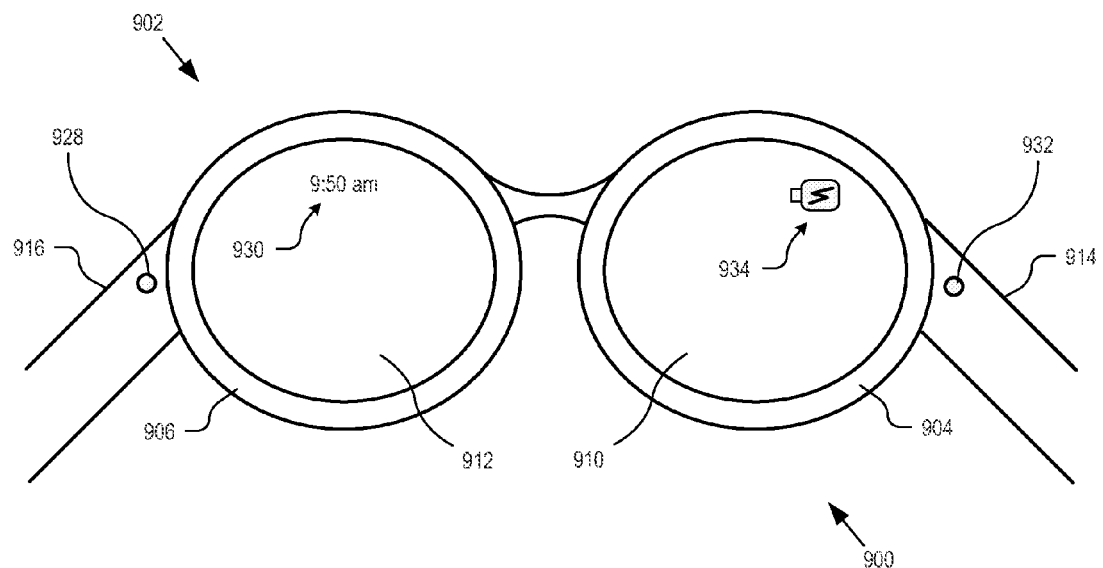
FIG. 9 illustrates an alternate view of an example system for receiving, transmitting, and displaying digital media data for control rooms.

FIG. 1 is a block diagram of exemplary system architecture 100 for enabling digital media control rooms. In one embodiment, the system 100 includes mobile devices 110-1 to 110-N and control room server 130. In one embodiment, a mobile device may be a binocular wearable computing device as illustrated in FIGS. 8 and 9, a monocular wearable computing device (i.e., a single eye head mounted display similar to those described in FIGS. 8 and 9), as well as a cellular telephone, tablet computer, etc. Furthermore, one or more of mobile devices 110-1 to 110-N may be a computing device, such as laptop or desktop computing system. The control room server 130 may also be a computing device, such as a server computer, desktop computer, etc.

The mobile devices 110 and control room server 130 may be coupled to a network 102 that communicates any of the standard protocols for the exchange of information. In one embodiment, mobile devices 110 are coupled with network 102 via a wireless connection, such as a cellular telephone connection, wireless fidelity connection, etc. The mobile devices 110 and control room server 130 may run on one Local Area Network (LAN) and may be incorporated into the same physical or logical system, or different physical or logical systems. Alternatively, the mobile devices 110 and control room server 130 may reside on different LANs, wide area networks, cellular telephone networks, etc. that may be coupled together via the Internet but separated by firewalls, routers, and/or other network devices. In yet another configuration, the control room server 130 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

The control room server 130 is responsible for hosting digital media control rooms and providing digital media data to control room client 112 of mobile device 110. As will be discussed below, a digital media control room provides a virtual location, similar to a chat room or online bulletin board, where users may access media data. In one embodiment, the media data for a digital media control room includes live or previously captured media data that is related to a particular real-world event, and captured from different devices and perspectives. For example, at a music concert, three users with mobile devices may be capturing live video data of the concert. One user may be located in a balcony of the concert hall, another user located in the front row, and a third user located back stage. Each user uploads the captured video data to a digital media control room associated with the concert, in real-time as the concert is taking place. Users of the mobile devices, as well as other users accessing the digital media control room via network 102, may then view one or more of the video feeds of the concert, switch between the different video feeds, etc. By providing the different video feeds, users may view the real-world event from different vantage points in real time as the event is occurring.

In one embodiment, a control room client 112 of mobile device 110-1 is responsible for creating a digital media control room. Although the discussion below describes mobile device 110-1 as creating a digital media control room, any computing device (e.g., a mobile telephone, laptop computer, desktop computer, wearable computing device, etc.) with a control room client 112 may create, view, and playback a digital media control room. In one embodiment, control room client 112 of mobile device 110-1 first transmits a query to control room system 132 to determine whether a control room exists for a real world event. In one embodiment, the query includes location data, such as global positioning system (GPS) data, captured by the mobile device 110-1. In one embodiment, control room system 132 utilizes the location data to determine whether there are any digital media control rooms associated with the location. In one embodiment, control room system 132 further utilizes a time when the query is received to narrow between different digital media control rooms. For example, a concert hall may have several digital media control rooms associated with the concert hall's location, but different digital media control rooms associated with different dates.

In one embodiment, control room system 132 responds to control room client 112 with the query results. When a control room exists for a real-world event, based on the location data and the time of the query, control room client 112 is provided with data indicative of the existing control room. As discussed in greater detail below, control room client 112 may then access the digital media control room, view digital media data associated with the control room, play back media associated with the digital media control room, etc. When a digital media control room does not exist for a given location and/or time, control room client 112 may create a new digital media control room. In one embodiment, control room client 112 tags a real world event by capturing a digital image of the event. In another embodiment, digital image data may be extracted from digital video data that is being captured of the event. In either embodiment, control room client 112 transmits the digital media data and a request to create a digital media control room, to control room system 132 of control room server 130. In one embodiment, the request may also include location data. In another embodiment, control room system 132 associates the request with the previously received location data.

In one embodiment, control room system 132 of control room server 130 receives the digital image data and the request to create a digital media control room. In response to receiving the request, control room system 132 allocates storage in control room media database 134 for digital media data to be associated with the digital media control room. Control room system 132 further stores the received media data as an identifying image for the digital media control room. In one embodiment, when other mobile devices, such as mobile device 110-N, or other computing devices, query control room system 132 for the availability of a digital media control room, control room system 132 may respond by providing the media data as a representative image of the digital media control room. For example, a user who creates a digital media control room for a concert may transmit an image captured of a band giving the concert to control room system 132. Then when another user searches for a digital media control room for the concert at control room server 130, control room system 132 may respond with the digital image of the band thereby informing the user that they have located the appropriate digital media control room.

In one embodiment, after mobile devices 110-1 to 110-N have accessed the digital media control room, one or more of mobile devices 110-1 to 110-N may transmit digital media data to control room server for the digital media control room. In one embodiment, the digital media data is live digital media data, such as digital video data, audio data, still images, etc. captured of the real world event and associated with the digital media control room. In one embodiment, control room system 132 streams the received digital media data to control room clients 112 of mobile devices 110-1 to 110-N, in real time as the data is received and as a real world event associated with the digital media control room is occurring. As discussed herein, because control room system 132 may receive several media streams for a digital media control room, control room system 132 transmits specific user selected media streams to each control room client 112. That is, the digital media streams for a digital media control room selected by, streamed to, and viewed by a user of mobile device 110-1, may be different from the digital media streams selected by, streamed to, and viewed by a user of mobile device 110-N. Each control room client 112 may select different video streams for live streaming and during playback, as discussed herein.

In one embodiment, control room client 112 displays the received digital media data for a digital media control room to a user. In one embodiment, the digital media streams are displayed in a digital media control room user interface. In one embodiment, where a mobile device is a user-wearable computing device (e.g., FIGS. 8 and 9), control room client 112 renders the received digital media streams over a field of view of a user.

In one embodiment, control room system 132 stores received digital media data in control room media database 134 for each digital media control room. In one embodiment, control room media database 134 stores the digital media data for later selection and playback by a control room client 112. In one embodiment, not only may control room system 132 provide access to live digital media data (e.g., digital media data that captures a real world event and is uploaded to control room system 132 in real time as the event is occurring), control room system 132 may provide access to prior digital media control rooms and the digital media data streamed via the prior digital media control rooms. In one embodiment, a control room client 112 that locates and selects a prior digital media control room, may access the digital media data, select media streams that may be different from the media streams viewed when the digital media control room was live, and view the digital media data for the control room as it originally happened. In one embodiment, control room system 132 accesses the stored digital media data and provides the data to control room client 112. In one embodiment, control room system 132 synchronizes the playback of different media streams from the prior digital media control room to simulate playback as if the playback were happening in real time.

However, playback of a media data streams from a prior digital media control room may be accompanied by playback controls such as rewind, fast forward, pause, media stream selection to enable the view of different angles of a live event, etc. In one embodiment, session data may be stored for each viewing at a digital media control room to enable playback of media streams from a prior digital media control room. The session data enables a user to view a live digital media control room as it was originally viewed, or select the same or different streams during playback to see new or different angles of the event that was the subject of the digital media control room.

Figure 2:
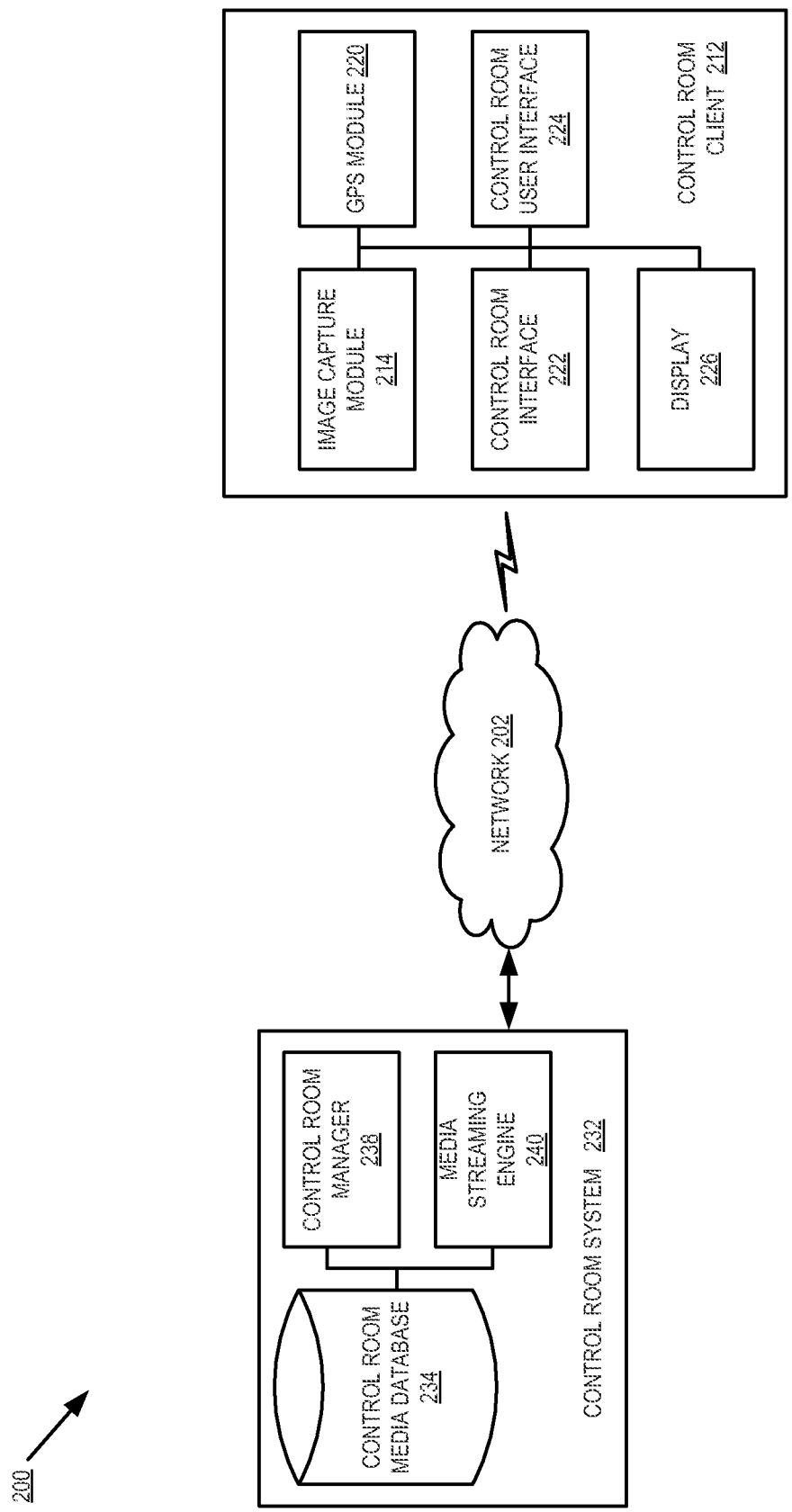
FIG. 2 is a block diagram of one embodiment of a control room system and a control room client.

FIG. 2 is a block diagram of one embodiment 200 of a control room system and a control room client. Control room client 212 and control room system 232 provide additional details for the control room client 112 and control room system 132 discussed above in FIG. 1.

In one embodiment, control room client 212 may include an image capture module 214, a global positioning system (GPS) module 220, a control room interface 222, a control room user interface 224, and a display 226. In one embodiment, control room system 232 may include a control room manager 238, a media streaming engine 240, and a control room media database 234. In one embodiment, the control room client 212 and control room system 232 communicate with each other over various networks and network configurations as discussed above in FIG. 1.

In the control room client 212, control room user interface 224 displays a graphical user interface on display 226. In one embodiment, graphical user interface 224 enables a user of control room client 212 to generate and execute searches for digital media control rooms, create new digital media control rooms, select between digital media streams, and operate playback of digital media control rooms from different times.

In one embodiment, control room interface 222 receives user commands from control room interface 224. In response to receiving a command to locate a digital media control room, control room interface 222 queries global positioning system (GPS) module 220 for a current location of control room client 212. Control room interface 222 then transmits the request, including the location data, to control room manager 238 of control room system 232. In one embodiment, control room interface 222 may also include a time in the request. In one embodiment, the time may be specified by a user via control room user interface and may specify the current time (e.g., a time corresponding to a live event) or a prior time (e.g., a time corresponding to a past event).

In one embodiment, control room manager 238 utilizes the location data, and time data if specified, in the request to search control room media database 234 for digital media control rooms associated with the location. In one embodiment, control room manager 234 may locate multiple digital media control rooms based on the received location data, and therefore may utilize the time data to narrow the located digital media control rooms. Control room manager 238 responds with the availability, or lack thereof, of digital media control rooms for a given location and a given time.

In one embodiment, control room interface 222 receives the indication of the availability, or lack thereof, of digital media control rooms. In one embodiment, control room user interface 224 enables a user to join a digital media control room, and provides the user with options to view media streams provided by the digital media control room, upload or broadcast media data captured by the image capture module 214 to the digital media control room, or do both. In one embodiment, viewing and uploading media data to a control room is provided by a control room client 212 of a mobile device.

In one embodiment, control room user interface 224 provides controls that enable a user to create a digital media control room. In one embodiment, control room user interface 224 receives user input to create a control room, a name associated with the control room, other data to be associated with the digital media control room (e.g., a digital image of a real world event captured by image capture module 214), etc. Control room interface 222 then transmits the data to control room manager 238 to create the digital media control room. In one embodiment, the request also includes location data captured by GPS module 220 to be associated with the digital media control room.

In one embodiment, control room interface 222 displays data indicative of available digital media control rooms. In one embodiment, the display may include a representative image captured by a user who created the digital media control room, a representative digital video clip from a media stream for a digital media control room, or other data utilized to identify a digital media control room. In one embodiment, control room user interface 224 may receive selection of a specific digital media control room and one or more media streams from the digital media control room. In one embodiment, these selections are transmitted by control room interface 222 to control room manager 238.

In one embodiment, control room manager 238 informs media streaming engine 240 of the one or more media streams selected by control room client 212. As discussed herein, media streams may be uploaded to control room system 232 from different control room clients 212. In one embodiment, media streaming engine 240 constantly provides media data to control room interface 222, corresponding to the selected media streams, as the media data is received by control room system 232. In one embodiment, control room interface 222 transmits updated user selections of media streams for a digital media control room to control room manager 238. Media streaming engine 240 receives the updated user selections, and adjusts which media streams are provided to control room client 212. In one embodiment, control room interface 222 receives the media streams from media streaming engine 240, and provides the media data to control room user interface 224. Control room user interface 224 displays the media streams on display 226 to a user.

In one embodiment, after control room interface 222 displays data indicative of the available digital media control rooms, control room user interface 224 may receive a command to upload media data to a selected digital media control room. In one embodiment, image capture module 214 captures digital media data, such as live video data, still digital images, etc., and uploads the digital media data to media streaming engine 240 of control room system 232. In one embodiment, the digital media data is streamed from control room client 212 to control room system 232 in real time as it is captured by control room client 212, and in turn streamed to other control room clients (not shown).

In one embodiment, as media streaming engine 240 receives digital media data from various control room clients, media streaming engine 240 stores the digital media data in control room media database 234. In one embodiment, media streaming engine 240 stores the digital media data along with timing data so that different media data streams for a single digital media control rooms can by synchronized during playback to a control room client, such as control room client 212.

Figure 3:
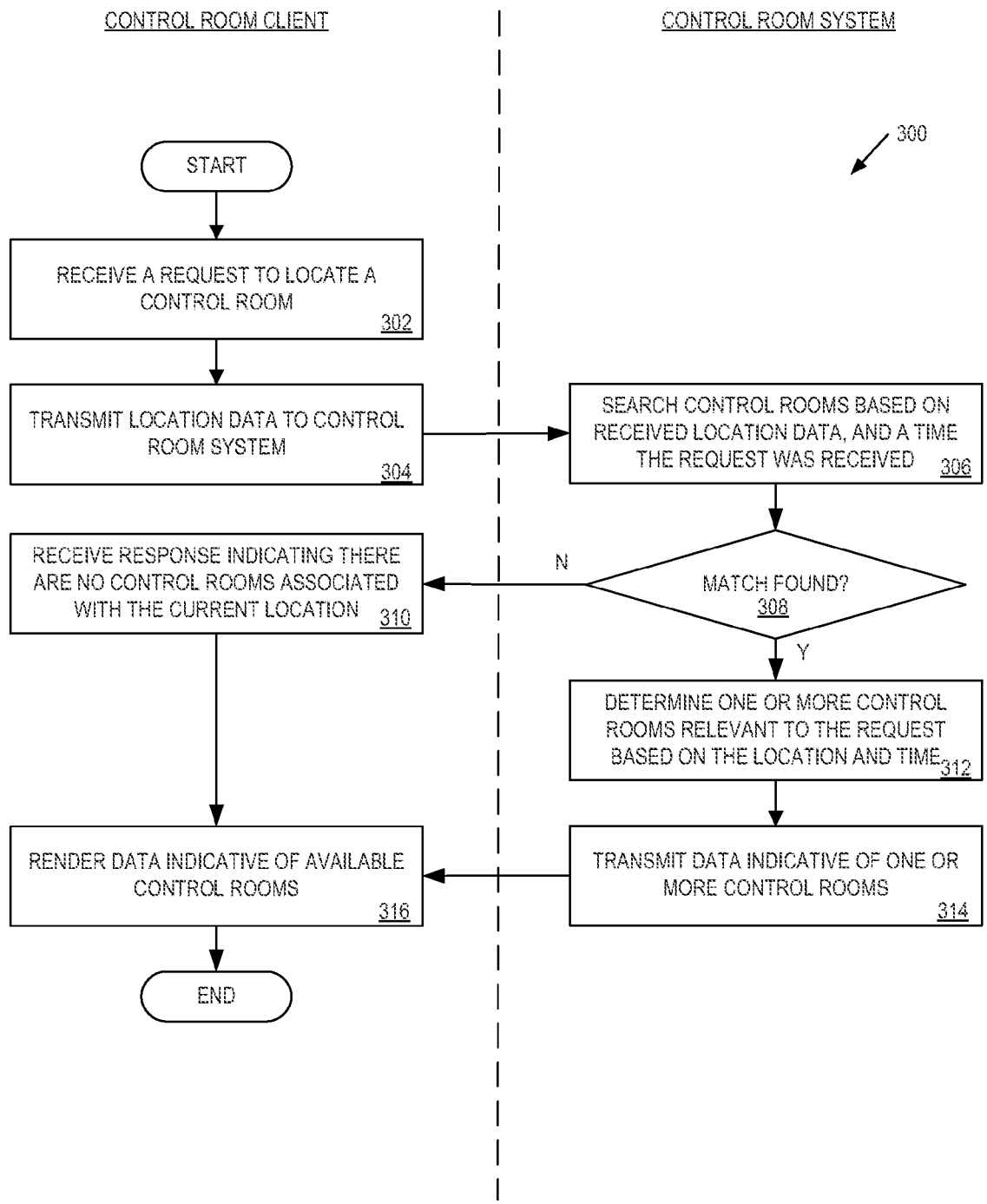
FIG. 3 is a flow diagram of one embodiment of a method for locating digital media control rooms.

FIG. 3 is a flow diagram of one embodiment of a method 300 for locating digital media control rooms. The method 300 is performed by processing logic that may comprise hardware (circuitry, dedicated logic, etc.), software (such as is run on a general purpose computer system or a dedicated machine), firmware, or a combination. In one embodiment, the method 300 is performed by a control room client and a control room system (e.g., control room client 112 or 212, and control room system 132 or 232).

Referring to FIG. 3, processing logic begins by receiving a request to locate a digital media control room (processing block 302). In one embodiment, the request may be user initiated. In another embodiment, the request is automatically generated by processing logic at periodic intervals. In this embodiment, digital media control rooms requests are initiated transparently so that users may be automatically notified when they are located near a digital media control room. In yet another embodiment, a request to locate a default group of digital media control rooms is received by processing logic in response to a control room client logging into a control room system.

In one embodiment, processing logic transmits location data to control room system (processing block 304). In one embodiment, time data may accompany the location data in the request to locate a digital media control room. In one embodiment, the time data may specify a current time, which is indicative of a request for a live digital media control room. In one embodiment, the time data may specify a prior time, which is indicative or a request to locate a previous digital media control room for playback. In embodiment, digital media control rooms may be located based on other factors, such as control rooms associated with a social networking circle, keyword text or voice searches on a description of a desired control room or words in a control room's name, participants (uploading or downloading media streams) in a digital media control room, or the analysis of image data captured by a mobile device issuing the request.

Processing logic receives the request and searches for digital media control rooms based on the received location data, and a time the request was received (processing block 306). In one embodiment, where time is provided along with location data in the request, the received time data is utilize by processing logic instead of the time the request was received. In one embodiment, processing logic utilizes the location data to determine if there are any digital media control rooms within a predefined range of the received distance (processing block 308). In one embodiment, the range may be specified by a user who originated the request, the range may be determined based on the location (i.e., if a location is within a sports stadium, the range may be extended to the perimeter of the stadium), or a pre-set range.

If there is no match, processing logic receives a response from control room system indicating that there are no control rooms associated with the current location (processing block 310). In one embodiment, when no control rooms are located, or the located control rooms are unsatisfactory, processing logic at a control room client may initiate another search request, as discussed above, or create a new control room, as discussed below in FIG. 4.

However, if there is a match, processing logic determines one or more control rooms relevant to the request based on the location and the time (processing block 312). In one embodiment, the one or more control rooms may be determined based on the factors discussed above, as well as a combination of factors that may include location and time. Processing logic transmits data indicative of the one or more digital media control rooms to control room client (processing block 314). In one embodiment, a location may be associated with several digital media control rooms. The different digital media control rooms may belong to different times, as well as different digital media control rooms for the same time. Processing logic renders data indicative of the available digital media control rooms (processing block 316).

Figure 4:
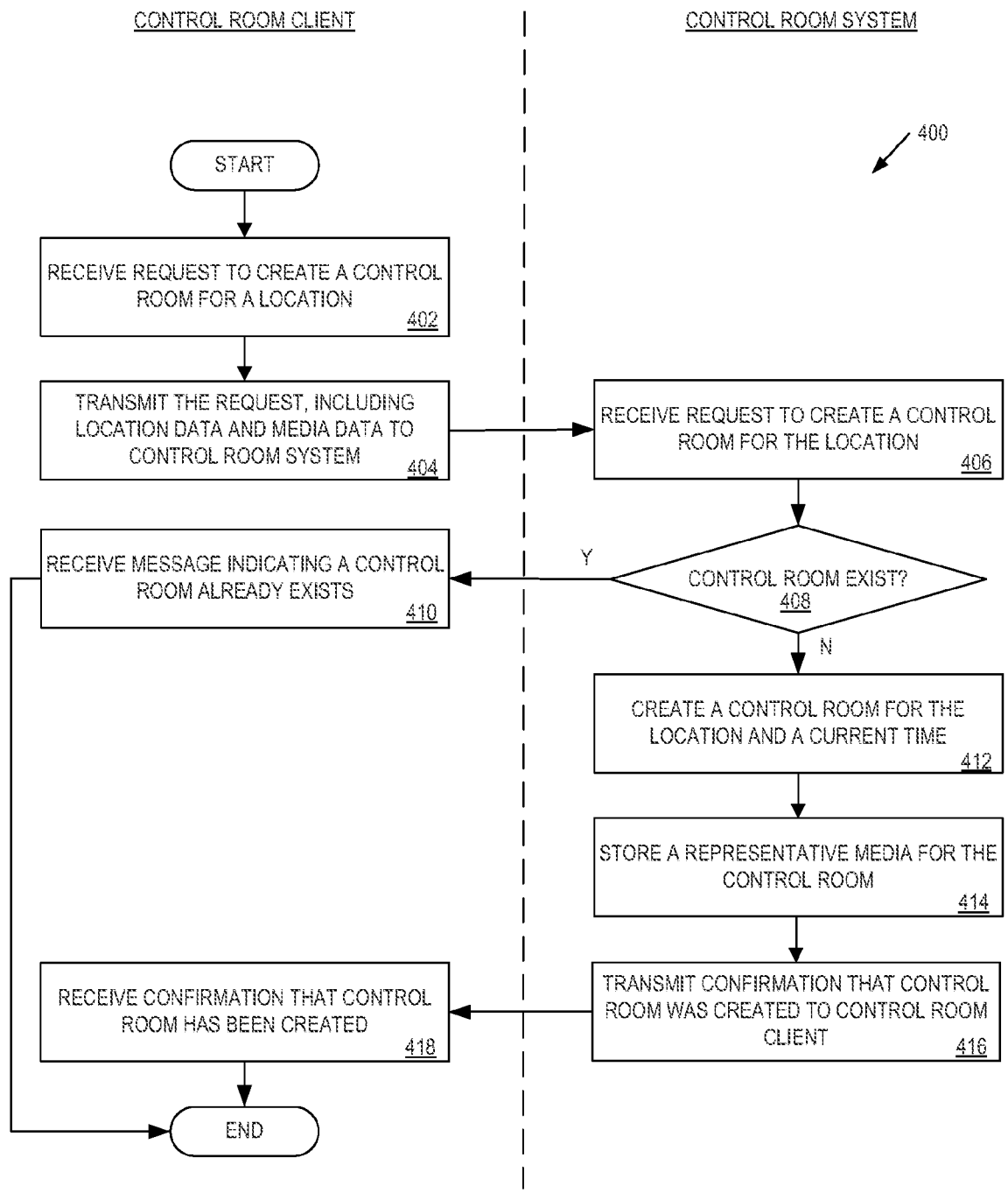
FIG. 4 is a flow diagram of one embodiment of a method for creating a digital media control room.

FIG. 4 is a flow diagram of one embodiment of a method 400 for creating a digital media control room. The method 400 is performed by processing logic that may comprise hardware (circuitry, dedicated logic, etc.), software (such as is run on a general purpose computer system or a dedicated machine), firmware, or a combination. In one embodiment, the method 400 is performed by a control room client and a control room system (e.g., control room client 112 or 212, and control room system 132 or 232).

Referring to FIG. 4, processing logic begins by receiving a request to create a digital media control room (processing block 402). In one embodiment, view of the available media control rooms as discussed in FIG. 3, enables a user to join one of those control rooms as discussed below in FIG. 5, or create a new digital media control room when an existing digital media control room is either unavailable or not of interest to a user as discussed below in FIG. 4. In one embodiment, the request may include a location. In another embodiment, the request need not include a location if a previous search, such as that discussed above in FIG. 3, for a location revealed that there were no current or past digital media control rooms.

Processing logic transmits the request, including location data and media data, to control room system (processing block 404). In one embodiment, the media data provides a representative image or video for a digital media control room. In one embodiment, the media data captures the real world event that is the subject of a digital media control room.

Processing logic receives the request to create a control room for the location (processing logic 406). Processing logic determines whether a control room fir the location already exists (processing block 408). When a control room already exists, processing logic at the control room client receives a message indicating that a control room already exists (processing block 410). In one embodiment, processing logic only allows one control room per location in a given time period. However, in another embodiment, any number of digital media control rooms may be created for a given location and time. In one embodiment, if different digital media control rooms exist for a given location and time, the user is enabled to determine which digital media control room to join. For example, friend groups in a social network could set up a private digital media control room for an event, even though there is already a public digital media control room for the event. In this embodiment, the digital media control room access could be limited or moderated, via password, membership in a social networking group, etc. by the user who created the digital media control room. Furthermore, users of a friend group may select to join one or more of the private digital media control room or the public digital media control rooms.

When no digital media control room exists for a given location at a given time, or processing logic allows multiple simultaneous digital media control rooms for a location, processing logic creates a digital media control room for the location and the current time (processing block 412). Processing logic further stores the media data as a representative media data for the digital media control room (processing block 414). After the digital media control room is created, processing logic transmits confirmation to control room client (processing block 416). Processing logic renders the received confirmation that a control room has been successfully created (processing block 418).

Figure 5:
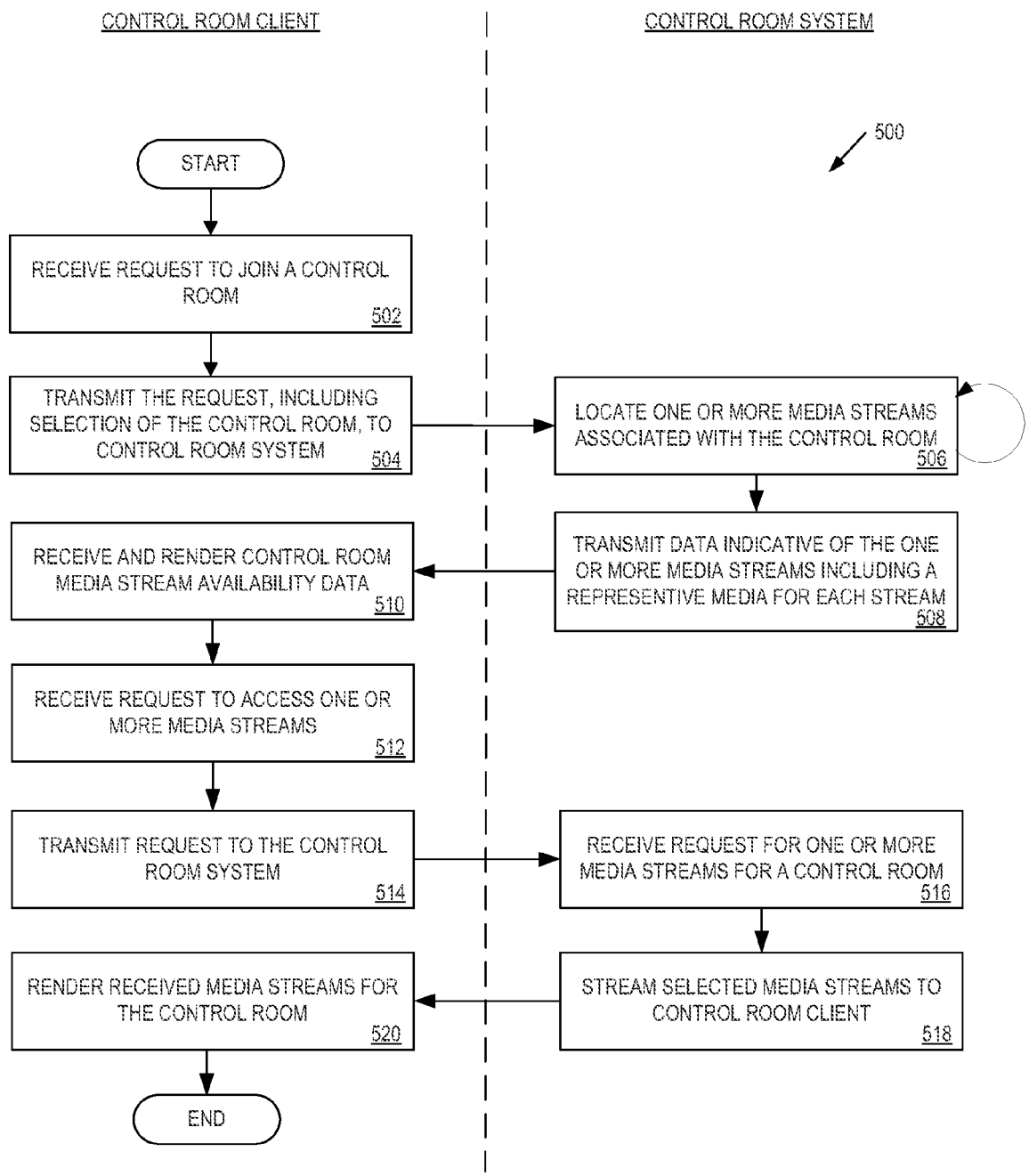
FIG. 5 is a flow diagram of one embodiment of a method for providing one or more live digital media streams in a digital media control room.

FIG. 5 is a flow diagram of one embodiment of a method 500 for providing one or more live digital media streams in a digital media control room. The method 500 is performed by processing logic that may comprise hardware (circuitry, dedicated logic, etc.), software (such as is run on a general purpose computer system or a dedicated machine), firmware, or a combination. In one embodiment, the method 400 is performed by a control room client and a control room system (e.g., control room client 112 or 212, and control room system 132 or 232).

Referring to FIG. 5, processing logic begins by receiving a request to join a digital media control room (processing block 502). In one embodiment, the request specifies one of the available digital media control rooms located in FIG. 3, created in FIG. 4, or otherwise located by processing logic. Processing logic transmits the request, including the selection of the control room, to control room system (processing block 504).

Processing logic utilizes the selected digital media control room to locate one or more media streams associated with the control room (processing block 506). In one embodiment, these media streams are captured by control room clients and streamed to control room system, as discussed herein. In one embodiment, processing logic periodically locates media streams for a selected digital media control room in order to update that availability of different media streams. As different control room clients add or drop media streams from a digital media control room, processing logic is able to update the available feeds to a control room client. Processing logic transmits data indicative of the one or more media streams, including a representative media for each stream (processing block 508). In one embodiment, the representative media may be a still image, an image extracted from video data, a video clip extracted from a live media stream, low resolution video data for a live media stream, text description of the media stream, etc.

Processing logic at the control room client receives and renders digital media control room stream availability (processing block 510). Processing logic receives a request to access one or more of the media streams (processing block 512) and transmits the request to control room system (processing block 514).

Processing logic at the control room system receives the request for one or more media streams for a digital media control room (processing block 516) and streams the selected media streams to a control room client (processing block 518). Processing logic at the control room client receives the streaming media from control room system and renders the streams for the digital media control room (processing block 520).

Figure 6:
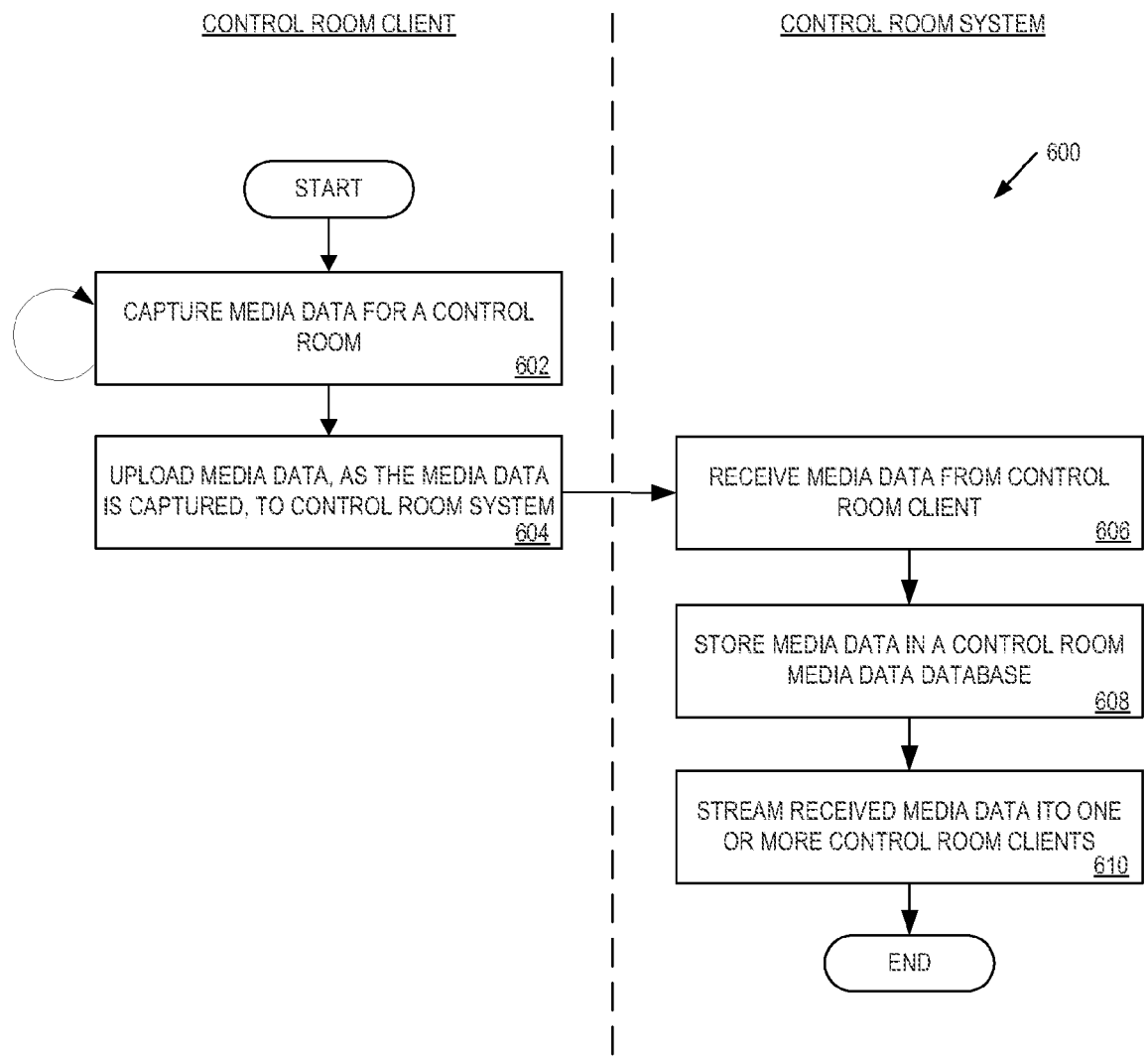
FIG. 6 is a flow diagram of one embodiment of a method for receiving uploaded digital media data for a digital media control room.

FIG. 6 is a flow diagram of one embodiment of a method 600 for receiving uploaded digital media data for a digital media control room. The method 600 is performed by processing logic that may comprise hardware (circuitry, dedicated logic, etc.), software (such as is run on a general purpose computer system or a dedicated machine), firmware, or a combination. In one embodiment, the method 600 is performed by a control room client and a control room system (e.g., control room client 112 or 212, and control room system 132 or 232).

Referring to FIG. 6, processing logic begins by capturing media data for a digital media control room (processing block 602). In one embodiment, processing logic captures a live real world event as the event occurs. In one embodiment, the media data is digital video data, a still digital image, a series of digital images, etc. Processing logic uploads the media data, as the media data is captured, to control room system (processing block 604). In one embodiment, processing logic of the control room client streams the capture media to control room system.

Processing logic receives the media data from control room client (processing block 606) and stores the media data in a control room media data database (processing block 608). Processing logic also streams the received media data to one or more control room clients (processing block 610). In one embodiment, those control room clients are those that have joined the digital media control room, and have selected the particular digital media stream.

Figure 7:
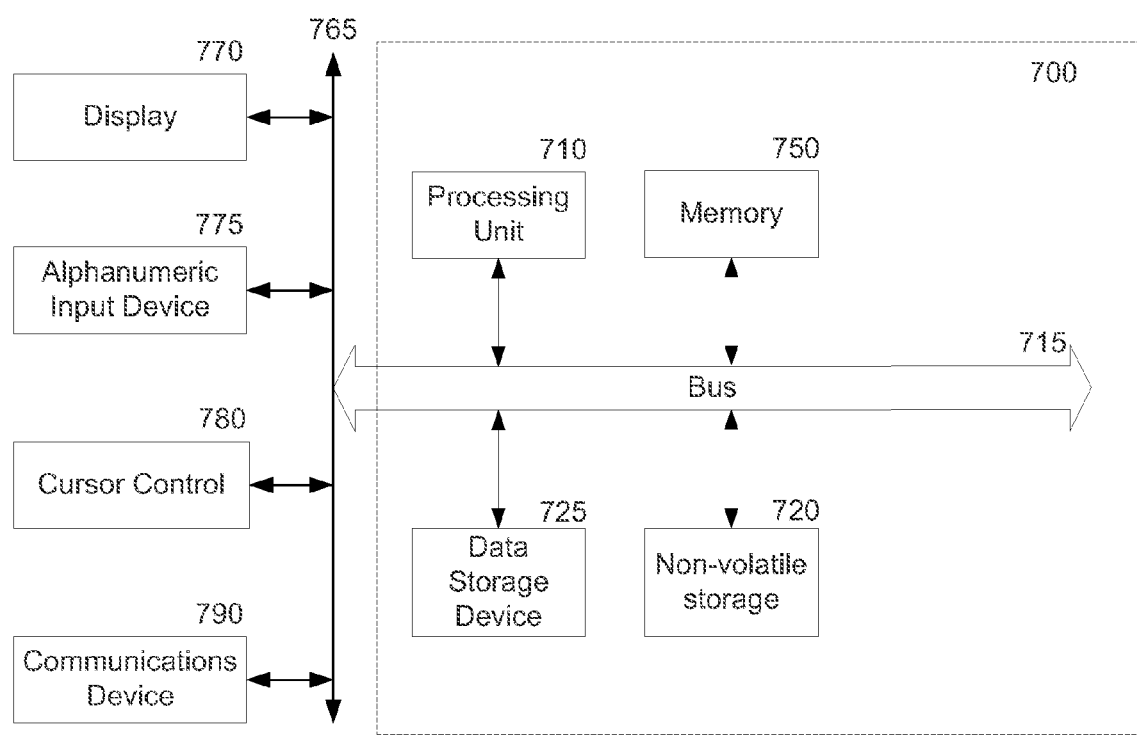
FIG. 7 illustrates a diagrammatic representation of a machine in the exemplary form of a computer system.

FIG. 7 is one embodiment of a computer system that may be used with the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

FIG. 8 illustrates an example system 800 for receiving, transmitting, and displaying digital media data for digital media control rooms. The system 800 is shown in the form of a wearable computing device. While FIG. 8 illustrates eyeglasses 802 as an example of a wearable computing device, other types of wearable computing devices could additionally or alternatively be used. As illustrated in FIG. 8, the eyeglasses 802 comprise frame elements including lens-frames 804 and 806 and a center frame support 808, lens elements 810 and 812, and extending side-arms 814 and 816. The center frame support 808 and the extending side-arms 814 and 816 are configured to secure the eyeglasses 802 to a user's face via a user's nose and ears, respectively. Each of the frame elements 804, 806, and 808 and the extending side-arms 814 and 816 may be formed of a solid structure of plastic or metal, or may be formed of a hollow structure of similar material so as to allow wiring and component interconnects to be internally routed through the eyeglasses 802. Each of the lens elements 810 and 812 may be formed of any material that can suitably display a projected image or graphic. Each of the lens elements 810 and 812 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 814 and 816 are each projections that extend away from the frame elements 804 and 806, respectively, and are positioned behind a user's ears to secure the eyeglasses 802 to the user. The extending side-arms 814 and 816 may further secure the eyeglasses 802 to the user by extending around a rear portion of the user's head. Additionally or alternatively, for example, the system 100 may connect to or be affixed within a head-mounted helmet structure. Other possibilities exist as well.

The system 800 may also include an on-board computing system 818, a video camera 820, a sensor 822, and finger-operable touch pads 824, 826. The on-board computing system 818 is shown to be positioned on the extending side-arm 814 of the eyeglasses 802; however, the on-board computing system 818 may be provided on other parts of the eyeglasses 802. The on-board computing system 818 may include a processor and memory, for example. The on-board computing system 818 may be configured to receive and analyze data from the video camera 820 and the finger-operable touch pads 824, 826 (and possibly from other sensory devices, user interfaces, or both) and generate images for output from the lens elements 810 and 812. The video camera 820 is shown to be positioned on the extending side-arm 814 of the eyeglasses 802; however, the video camera 820 may be provided on other parts of the eyeglasses 802. The video camera 820 may be configured to capture images at various resolutions or at different frame rates. Many video cameras with a small form-factor, such as those used in cell phones or webcams, for example, may be incorporated into an example of the system 800. Although FIG. 8 illustrates one video camera 820, more video cameras may be used, and each may be configured to capture the same view, or to capture different views. For example, the video camera 820 may be forward facing to capture at least a portion of the real-world view perceived by the user. This forward facing image captured by the video camera 820 may then be used to generate an augmented reality where computer generated images appear to interact with the real-world view perceived by the user.

The sensor 822 is shown mounted on the extending side-arm 816 of the eyeglasses 802; however, the sensor 822 may be provided on other parts of the eyeglasses 802. The sensor 822 may include one or more of a gyroscope or an accelerometer, for example. Other sensing devices may be included within the sensor 822 or other sensing functions may be performed by the sensor 822. The finger-operable touch pads 824, 826 are shown mounted on the extending side-arms 814, 816 of the eyeglasses 802. Each of finger-operable touch pads 824, 826 may be used by a user to input commands. The finger-operable touch pads 824, 826 may sense at least one of a position and a movement of a finger via capacitive sensing, resistance sensing, or a surface acoustic wave process, among other possibilities. The finger-operable touch pads 824, 826 may be capable of sensing finger movement in a direction parallel or planar to the pad surface, in a direction normal to the pad surface, or both, and may also be capable of sensing a level of pressure applied. The finger-operable touch pads 824, 826 may be formed of one or more translucent or transparent insulating layers and one or more translucent or transparent conducting layers. Edges of the finger-operable touch pads 824, 826 may be formed to have a raised, indented, or roughened surface, so as to provide tactile feedback to a user when the user's finger reaches the edge of the finger operable touch pads 824, 826. Each of the finger-operable touch pads 824, 826 may be operated independently, and may provide a different function.

FIG. 9 illustrates an alternate view 900 of the system 800 of FIG. 8. As shown in FIG. 9, the lens elements 910 and 912 may act as display elements. The eyeglasses 902 may include a first projector 928 coupled to an inside surface of the extending side-arm 916 and configured to project a display 930 onto an inside surface of the lens element 912.

Additionally or alternatively, a second projector 932 may be coupled to an inside surface of the extending sidearm 914 and configured to project a display 934 onto an inside surface of the lens element 910. The lens elements 910 and 912 may act as a combiner in a light projection system and may include a coating that reflects the light projected onto them from the projectors 928 and 932.

In some embodiments, a special coating may not be used (e.g., when the projectors 928 and 932 are scanning laser devices). In alternative embodiments, other types of display elements may also be used. For example, the lens elements 910, 912 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 904 and 906 for driving such a matrix display. Alternatively or additionally, a laser or LED source and scanning system could be used to draw a raster display directly onto the retina of one or more of the user's eyes. Other possibilities exist as well.

Figure 10:
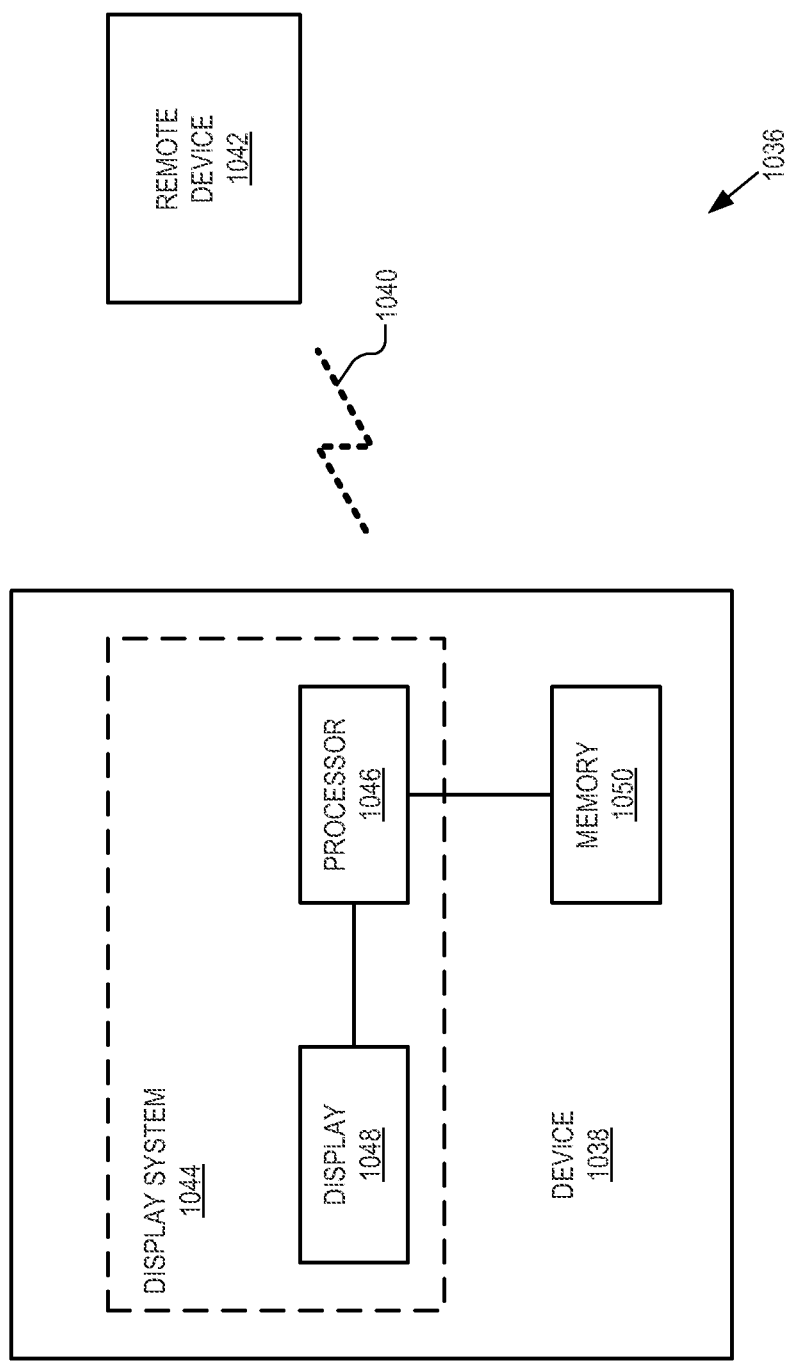
FIG. 10 illustrates an example schematic drawing of a computer network infrastructure.

FIG. 10 illustrates an example schematic drawing of a computer network infrastructure. In one system 1036, a device 1038 communicates using a communication link 1040 (e.g., a wired or wireless connection) to a remote device 1042. The device 1038 may be any type of device that can receive data and display information corresponding to or associated with the data. For example, the device 1038 may be a heads-up display system, such as the eyeglasses 1002 described with reference to FIGS. 7 and 8. Thus, the device 1038 may include a display system 1044 comprising a processor 1046 and a display 1048. The display 1048 may be, for example, an optical see-through display, an optical see-around display, or a video see-through display. The processor 1046 may receive data from the remote device 1042, and configure the data for display on the display 1048. The processor 1046 may be any type of processor, such as a micro-processor or a digital signal processor, for example. The device 1038 may further include on-board data storage, such as memory 1050 coupled to the processor 1046. The memory 1050 may store software that can be accessed and executed by the processor 1046, for example.

The remote device 1042 may be any type of computing device or transmitter including a laptop computer, a mobile telephone, etc., that is configured to transmit data to the device 1038. The remote device 1042 and the device 1038 may contain hardware to enable the communication link 1040, such as processors, transmitters, receivers, antennas, etc.

In FIG. 10, the communication link 1040 is illustrated as a wireless connection; however, wired connections may also be used. For example, the communication link 1040 may be a wired link via a serial bus such as a universal serial bus or a parallel bus. A wired connection may be a proprietary connection as well. The communication link 1040 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 1042 may be accessible via the Internet and may comprise a computing cluster associated with a particular web service (e.g., social-networking, photo sharing, address book, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A computer-implemented method comprising:
   sending a request from a first mobile device to a server computer system for the mobile device to join a digital media control room, wherein the digital media control room is a virtual location that provides access to digital media data of a real-world event captured by a plurality of different mobile devices that have each joined the digital media control room;
   receiving, at the first mobile device, data indicating available media streams associated with the digital media control room that capture the real-world event as the real-world event occurs, each of the media streams depicting the real-world event captured by a respective one of the different mobile devices that has joined the media control room;
   sending a request from the first mobile device to the server computer system to access a first media stream of the available media streams associated with the digital media control room; receiving at the first mobile device the first media stream for display at the first mobile device; and
   displaying at the first mobile device the first media stream;
   sending a request from the first mobile device to access a second media stream of the available media streams associated with the digital media control room;
   receiving at the first mobile device synchronized first and second media streams for display at the mobile device; and
   displaying the synchronized first and second media streams at the first mobile device.

2. The method of claim 1, wherein the digital media control room is the virtual location and is associated with a real-world location and a time.

3. The computer-implemented method of claim 1, wherein media streams are streamed to the first mobile device in real time as the real-world event occurs.

4. The computer-implemented method of claim 1, further comprising:
   sending a request from the first mobile device to the server computer system to create a particular digital media control room for the real-world event, the request including a representative media data captured by the mobile device of the real-world event; and
   receiving data at the first mobile device indicate the creation of the particular digital media control room that is associated with the representative media data with the new digital media control room.

5. The computer-implemented method of claim 4, wherein:
   the request from the first mobile device to the server computer system to create a particular digital media control room comprises a request to create a private control room in which access to the private control room is limited to a set of users associated with other mobile devices.

6. A non-transitory computer readable storage medium including instructions that, when executed by a processor, cause the processor to perform operations comprising:
   sending a request from a first mobile device to a server computer system for the mobile device to join a digital media control room, wherein the digital media control room is a virtual location that provides access to digital media data of a real-world event captured by a plurality of different mobile devices that have each joined the digital media control room;
   receiving, at the first mobile device, data indicating available media streams associated with the digital media control room that capture the real-world event as the real-world event occurs, each of the media streams depicting the real-world event captured by a respective one of the different mobile devices that has joined the media control room;
   sending a request from the first mobile device to the server computer system to access a first media stream of the available media streams associated with the digital media control room; receiving at the first mobile device the first media stream for display at the first mobile device; and
   displaying at the first mobile device the first media stream;
   sending a request from the first mobile device to access a second media stream of the available media streams associated with the digital media control room;
   receiving at the first mobile device synchronized first and second media streams for display at the mobile device; and
   displaying the synchronized first and second media streams at the first mobile device.

7. The non-transitory computer readable storage medium of claim 6, wherein the digital media control room is the virtual location and is associated with a real-world location and a time.

8. The non-transitory computer readable storage medium of claim 6, wherein media streams are streamed to the first mobile device in real time as the real-world event occurs.

9. The non-transitory computer readable storage medium of claim 6, the operations further comprising:
   sending a request from the first mobile device to the server computer system to create a particular digital media control room for the real-world event, the request including a representative media data captured by the mobile device of the real-world event; and
   receiving data at the first mobile device indicate the creation of the particular digital media control room that is associated with the representative media data with the new digital media control room.

10. The non-transitory computer readable storage medium of claim 9, wherein:
    the request from the first mobile device to the server computer system to create a particular digital media control room comprises a request to create a private control room in which access to the private control room is limited to a set of users associated with other mobile devices.

11. A mobile device, comprising:
    a processor and a communication system; and
    a memory storing instructions executable by the processor and that upon such execution cause the mobile device to perform operations comprising:

sending a request from the mobile device to a server computer system for the mobile device to join a digital media control room, wherein the digital media control room is a virtual location that provides access to digital media data of a real-world event captured by a plurality of different mobile devices that have each joined the digital media control room;

receiving, at the mobile device, data indicating available media streams associated with the digital media control room that capture the real-world event as the real-world event occurs, each of the media streams depicting the real-world event captured by a respective one of the different mobile devices that has joined the media control room;

sending a request from the mobile device to the server computer system to access a first media stream of the available media streams associated with the digital media control room; receiving at the mobile device the first media stream for display at the mobile device; and displaying at the mobile device the first media stream;

sending a request from the mobile device to access a second media stream of the available media streams associated with the digital media control room;

receiving at the mobile device synchronized first and second media streams for display at the mobile device; and displaying the synchronized first and second media streams at the mobile device.

12. The mobile device of claim 11, wherein the digital media control room is the virtual location and is associated with a real-world location and a time.

13. The mobile device of claim 11, wherein media streams are streamed to the mobile device in real time as the real-world event occurs.

14. The mobile device of claim 11, the operations further comprising:

sending a request from the mobile device to the server computer system to create a particular digital media control room for the real-world event, the request including a representative media data captured by the mobile device of the real-world event; and receiving data at the first mobile device indicate the creation of the particular digital media control room that is associated with the representative media data with the new digital media control room.

15. The mobile device of claim 14, wherein:

the request from the mobile device to the server computer system to create a particular digital media control room comprises a request to create a private control room in which access to the private control room is limited to a set of users associated with other mobile devices.

* * * * *